(12) United States Patent
Kim et al.

(10) Patent No.: US 7,834,581 B2
(45) Date of Patent: Nov. 16, 2010

(54) APPARATUS AND METHOD FOR SENSING ATTACHMENT OR DETACHMENT OF BATTERY IN PORTABLE TERMINAL

(75) Inventors: Hyun-Yil Kim, Gumi-si (KR); Ki-Ho Cho, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 518 days.

(21) Appl. No.: 11/861,929

(22) Filed: Sep. 26, 2007

(65) Prior Publication Data

US 2008/0246433 A1    Oct. 9, 2008

(30) Foreign Application Priority Data

Apr. 3, 2007    (KR) .................... 10-2007-0032990

(51) Int. Cl.
*H02J 7/00* (2006.01)

(52) U.S. Cl. ....................................... 320/103; 320/128

(58) Field of Classification Search .................. 320/103, 320/106, 109, 110, 111, 113, 115, 128
See application file for complete search history.

(56) References Cited

U.S. PATENT DOCUMENTS

| 5,200,685 A * | 4/1993 | Sakamoto .................. 320/103 |
| 6,191,552 B1 * | 2/2001 | Kates et al. ................. 320/112 |
| 6,392,383 B1 * | 5/2002 | Takimoto et al. ........... 320/115 |
| 2006/0279250 A1 * | 12/2006 | Keely et al. ................. 320/103 |
| 2008/0106232 A1 * | 5/2008 | Idzik et al. .................. 320/103 |

* cited by examiner

*Primary Examiner*—Edward Tso
*Assistant Examiner*—M'Baye Diao
(74) *Attorney, Agent, or Firm*—H.C. Park & Associates, PLC

(57) ABSTRACT

A method for sensing detachment of a external battery in a portable terminal including a connector with which the external battery is detachably assembled includes determining that the external battery is assembled with the connector when an output voltage is observed, connecting the connector and an internal battery of the portable terminal to supply power from the external battery to the internal battery, disconnecting the connector from the internal battery to check an output voltage of the connector, and determining that the external battery has been detached from the connector when an output voltage is not observed.

14 Claims, 3 Drawing Sheets

APPARATUS AND METHOD FOR SENSING ATTACHMENT OR DETACHMENT OF BATTERY IN PORTABLE TERMINAL

CROSS REFERENCE TO RELATED APPLICATION

This application claims priority from and the benefit of Korean Patent Application No. 10-2007-0032990, filed on Apr. 3, 2007, which is hereby incorporated by reference for all purposes as if fully set forth herein.

BACKGROUND OF THE INVENTION

1. Field of the Invention

The present invention relates to an apparatus and a method for sensing attachment or detachment of a battery in a mobile terminal, and more particularly to an apparatus and a method for sensing attachment or detachment of a detachable external battery in a mobile terminal.

2. Discussion of the Background

Various functions have been added to portable terminals to satisfy various user demands. Particularly, in addition to typical functions, such as email, Internet, and games, a multimedia function to transmit data and video, is often added to the portable terminal.

The various functions of the portable terminal provide users with various conveniences via the portable terminal. However, the addition of functions may also cause the amount of power used by the portable terminal, i.e. the amount of battery consumption, to continuously increase. Therefore, the user may have to charge the battery of the portable terminal more frequently.

In this case, a detachable external battery, which can be attached to and detached from the portable terminal depending on the user's need, may allow a user to avoid the inconvenience associated with having to frequently charge the battery of the portable terminal.

In a portable terminal having a detachable external battery, the external battery and the main body of the portable terminal may be connected to each other through three connector nodes.

Two of the three connector nodes may be used to charge the external battery, and the remaining connector node may be used to determine whether the external battery is detached from the portable terminal, i.e. to sense attachment/detachment of the external battery.

In the portable terminal having the detachable external battery, a pull-up voltage may be applied to the connector node that is used to determine whether the external battery is detached from the portable terminal so that a voltage may be observed when the external battery is assembled with the portable terminal.

When the external battery is detached from the portable terminal, the connector node that is used to determine whether the external battery is detached from the portable terminal may be grounded so that a voltage is not observed. As a result, the portable terminal may determine that the external battery is detached therefrom.

However, in such a scheme for sensing detachment of the external battery, it is necessary that a connector of the terminal include three nodes.

SUMMARY OF THE INVENTION

The present invention provides an apparatus and a method, which may conveniently determine if an external battery is detached from a connector in a portable terminal with which the external battery may be detachably assembled.

The present invention also provides an apparatus and a method, which may determine if an external battery is detached from a connector in a portable terminal that has only two charge nodes.

Additional features of the invention will be set forth in the description which follows, and in part will be apparent from the description, or may be learned by practice of the invention.

The present invention discloses a method for sensing detachment of a external battery from a portable terminal including a connector with which the external battery is detachably assembled. The method includes determining that the external battery is assembled with the connector when an output voltage is observed, connecting the connector and an internal battery of the portable terminal to supply power from the external battery to the internal battery, disconnecting the connector from the internal battery to check an output voltage of the connector, and determining that the external battery has been detached from the connector when an output voltage is not observed.

The present invention also discloses an apparatus for sensing detachment of a detachable external battery from a mobile terminal. The apparatus includes a connector to output power from the external battery when the external battery is assembled with the connector. The external battery is detachable from the connector. A switch unit connects the connector and an internal battery of the portable terminal to supply power from the external battery to the internal battery or disconnects the connector and the internal battery from each other to cut off the power from the internal battery. A controller connects the connector and the internal battery when an output voltage of the connector is observed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
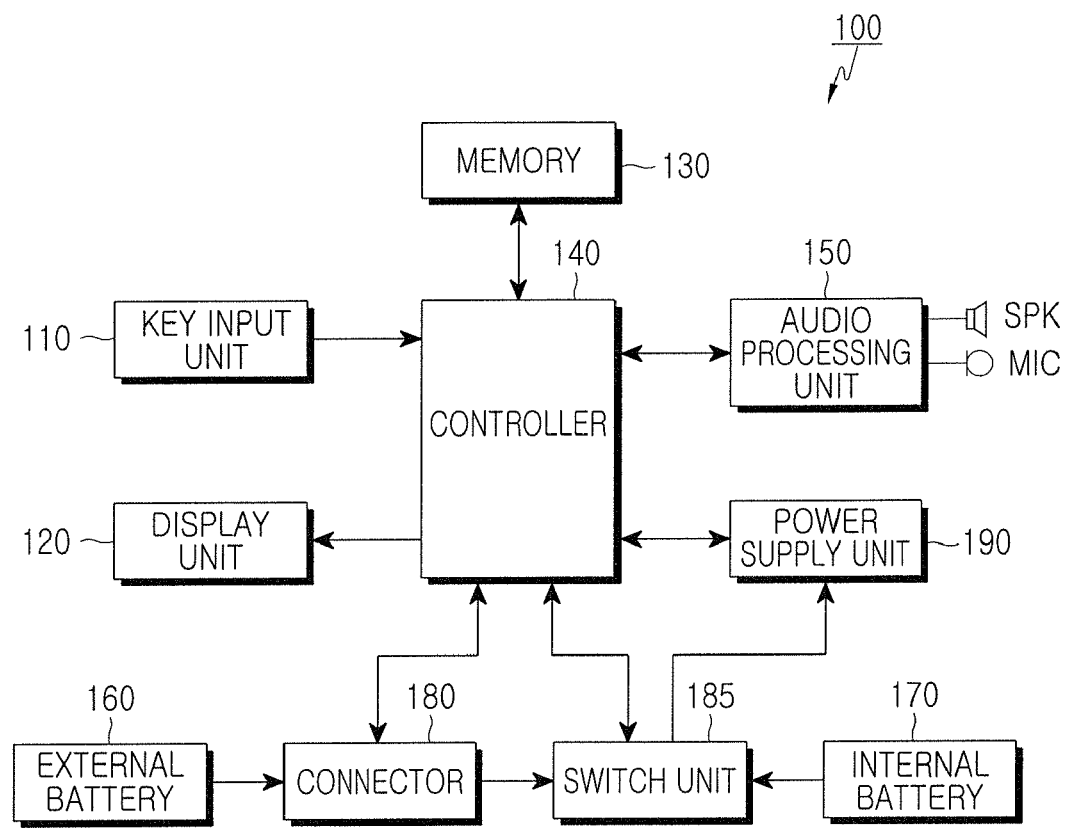
FIG. 1 is a block diagram of a portable terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

FIG. 1 is a block diagram of a portable terminal according to an exemplary embodiment of the present invention.

The portable terminal 100 includes a key input unit 110, a display unit 120, a memory unit 130, a controller 140, an audio processing unit 150, an external battery 160, an internal battery 170, a connector 180, a switch unit 185, and a power supply unit 190.

The key input unit 110 may include character keys, numeric keys, various function keys, and an external volume key and outputs key input signals, which correspond to key input from a user, to the controller 140.

The display unit 120 may include a liquid crystal display (LCD) and outputs a wide variety of display data generated in the portable terminal. If an LCD with touch screen technology is implemented, the display unit 120 can also operate as an input unit.

The memory unit 130 may include program memories and data memories and stores a wide variety of information required to operate the portable terminal 100 according to an exemplary embodiment of the present invention and a wide variety of information selected by the user.

The controller 140 controls the overall operation of the portable terminal 100 and checks the level of power output by the connector 180. If this power level is more than a predetermined reference voltage value (e.g. 0.5V), the controller 140 determines that the external battery 160 is assembled with the connector 180.

Furthermore, when the controller 140 determines that the external battery 160 is assembled with the connector 180, the controller 140 turns on the switch unit 185 to connect the connector 180 and the internal battery 170, thereby allowing power from the external battery 160 to be supplied to the internal battery 170. When the external battery 160 is assembled with the connector 180 and the remaining capacity of the internal battery 170 is less than a preset value, the controller 140 may turn on the switch unit 185 to connect the connector 180 and the internal battery 170. At this time, the external battery 160 and the internal battery 170 are connected via the connector 180 and power from each of the external battery 160 and the internal battery 170 is transferred to the power supply unit 190.

When the connector 180 and the internal battery 170 are connected, the controller 140 periodically turns off the switch unit 185 at predetermined time intervals (e.g. 20 miliseconds) for a preset period (e.g. one second) so as to release the connection and check the output voltage of the connector 180, i.e. the voltage of an output node through which power of the external battery 160 is output.

The controller 140 determines that the external battery 160 has been detached from the connector 180 if an output voltage is not observed. When an output voltage is not observed, the controller 140 keeps the switch unit 185 turned off so that the connector 180 and the internal battery 170 are not connected.

Figure 2:
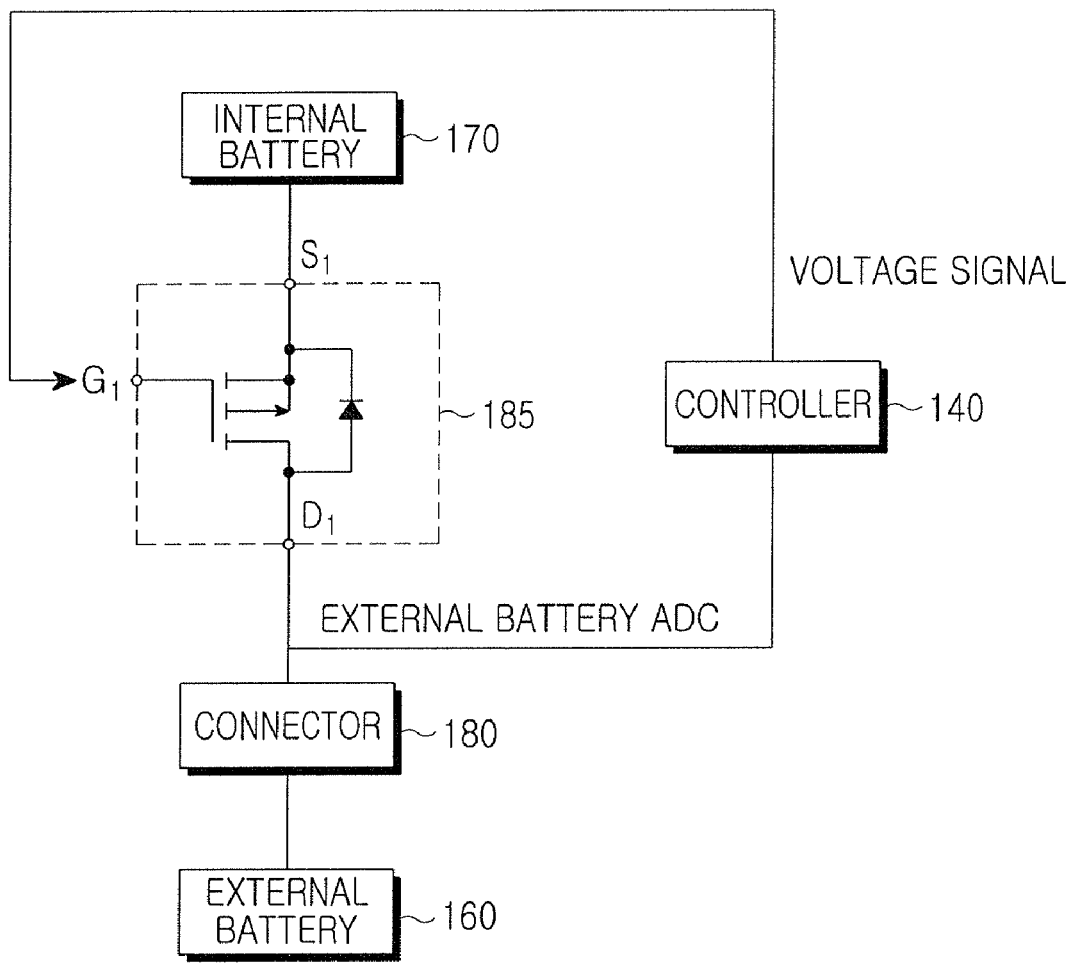
FIG. 2 is a block diagram showing a detailed configuration of a switch unit in a portable terminal according to an exemplary embodiment of the present invention.

Referring to FIG. 2, the reason why the controller 140 turns off the switch unit 185 at a preset interval to check the output voltage of the connector 180 will be described hereinafter.

FIG. 2 is a block diagram showing a detailed configuration of the switch unit in the portable terminal according to an exemplary embodiment of the present invention.

The switch unit 185 shown in FIG. 2 is implemented as a P-channel MOSFET. A source node (S1) of the P-channel MOSFET is connected to the internal battery 170 and a drain node (D1) is connected to the connector 180 with which the external battery 160 is assembled.

When the switch unit 185 is turned on by the controller 140, a channel in the P-channel MOSFET is opened so that power from the external battery 160 is supplied to the internal battery 170 through the source node (S1).

If the user detaches the external battery 160 from the connector 180 when power from the external battery 160 is being supplied to the internal battery 170 so that the voltage of the drain node (D1) drops to 0V, the voltage of the internal battery 170, which is connected to the source node (S1), is applied to the drain node (D1) and is observed therein because no change occurs in the channel which has already been opened.

As a result, although the external battery 160 is actually detached from the connector 180, the controller 140 recognizes the voltage of the internal battery 170, which is applied to the drain node (D1), as an output voltage of the external battery 160. Therefore, the controller 140 may be unable to determine if the external battery 160 is detached from the connector 180.

To solve this problem, the controller 140 applies a "HIGH" (high level) voltage signal to a gate node (G1) of the switch unit 185 to satisfy a turn-off condition of the switch unit 185, that is, a gate-source voltage (Vgs)<0. Therefore, the controller 140 temporarily turns off the switch unit 185.

If the switch unit 185 is turned off, the channel of the P-channel MOSFET is closed, the voltage of the source node (S1), i.e. a voltage of the internal battery 170, is no longer observed in the drain node (D1).

At this time, the controller 140 checks the voltage of the drain node (D1). The controller 140 determines that the external battery 160 has been detached from the connector when an output voltage, i.e., an output voltage of the external battery 160, is not observed. The controller 140 determines that the external battery 160 has not been detached from the connector 180 when an output voltage is observed.

The switch unit 185 may be implemented in many ways. For example, the drain node (D1) and the source node (S1), which are shown in FIG. 2, can be connected to each other by a switch.

When the switch is turned on so that power from the external battery 160 is supplied to the internal battery 170, the controller 140 recognizes a voltage of the internal battery 170, which is transferred to the drain node (D1) via the switch, as an output voltage of the external battery 160 even when the external battery 160 is detached from the connector 180. Therefore, the controller 140 may be unable to determine if the external battery is detached from the connector.

To solve this problem, the controller 140 periodically applies interrupt signals to the switch unit 185 to temporarily turn off the switch.

When the switch is turned off, the voltage of the internal battery 170 is no longer observed in the drain node (D1) connected to the connector 180.

The controller 140 checks the voltage of the drain node (D1) while the switch is turned off. The controller 140 determines that the external battery 160 has been detached from the connector when an output voltage, i.e., an output voltage of the external battery 160, is not observed. The controller 140 determines that the external battery 160 has not been detached from the connector when an output voltage is observed.

The audio processing unit 150 modulates electric signals input by a microphone to convert the audio signals to voice data and demodulates encoded voice data input from a wireless transceiver (not shown) to electric signals so as to output the voice data via a speaker.

Furthermore, the audio processing unit 150 may include a codec to convert digital audio signals, which are received from the wireless transceiver, to analog signals for regeneration and to convert analog audio signals, which are generated by a microphone, to digital audio signals. The codec may include a data codec to process packet data and an audio codec to process audio signals such as voice. The codecs may be spaced apart from or included in the controller 140.

The controller 140 controls the external battery 160 and the internal battery 170 to apply power to the power supply unit 190. The external battery 160 can be detached from the connector 180.

The connector 180 includes only two charge nodes, particularly a (+) node and a ground (GND) node according to an exemplary embodiment of the present invention. A port is connected to the controller 140 to enable the controller 140 to check an output voltage. Furthermore, when the external battery 160 is assembled with the connector 180, the connector 180 outputs power from the external battery 160 and applies the power to the switch unit 185.

Although the switch unit 185 is implemented as the P-channel MOSFET according to an exemplary embodiment of the present invention, the switch unit 185 may be implemented as any suitable type of switch.

The switch unit 185 connects or disconnects the connector 180 and the internal battery 170 according to an on/off control signal of the controller 140, so that power from the external battery 160 is either supplied to the internal battery 170 or cut off from the internal battery 170.

As such, the connector 180 and the internal battery 170 are connected through the switch unit 185 so that the external battery 160 and the internal battery 170 are connected via the connector 180. Power from the external battery 160 is transferred to the internal battery 170 through the switch unit 185 to charge the internal battery 170, and power from each of the external battery 160 and the internal battery 170, which are connected via the connector 180, is transferred to the power supply unit 190. The controller 140 can control switch unit 185 to switch on one of power of the internal battery 160 and power of the external battery 170 and transfer the corresponding power to the power supply unit 190.

The power supply unit 190 adjusts the level of power transferred through the switch unit 185 to a proper level and then supplies the power with a direct current voltage to each unit in the portable terminal 100.

Figure 3:
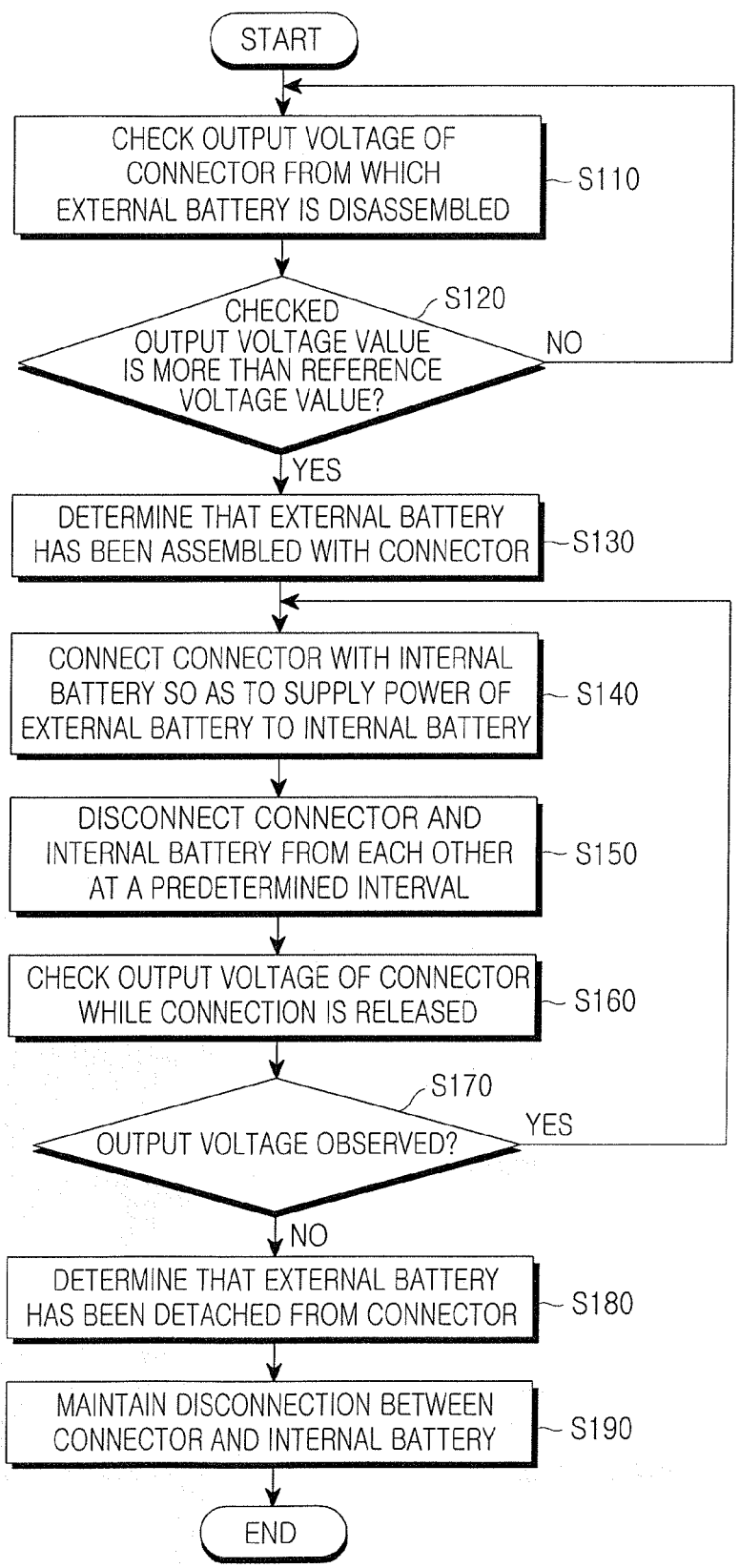
FIG. 3 is a flow chart showing the operation of a portable terminal according to an exemplary embodiment of the present invention.

FIG. 3 is a flow chart showing the operation of the portable terminal according to an exemplary embodiment of the present invention.

Referring to FIG. 1 and FIG. 3, the controller 140 checks an output voltage of the connector 180 from which the external battery 160 can be detached (step S110). Particularly, the controller 140 checks if a voltage of the external battery 160 is observed in an output node of the connector 180.

The controller 140 confirms if the checked output voltage of the connector 180 is higher than a predetermined reference voltage (step S120). The reference voltage may be about 0.5 V in consideration of accidental errors that may occur when the controller 140 performs analog-digital conversion of the output voltage of the connector 180.

The controller 140 determines that the external battery 160 is assembled with the connector 180 if the checked output voltage is higher than the reference voltage (step S1130).

When determining that the external battery 160 is assembled with the connector 180, the controller 140 turns on the switch unit 185 to connect the connector 180 and the internal battery 170. The controller 140 supplies power of the external battery 160 to the internal battery 170 (step S140). In general, when the controller 140 controls the external battery 160 to supply power to the internal battery 170, power from the external battery 160 is used to charge the internal battery 170 because the remaining capacity of the internal battery 170 is less than a predetermined value. The external battery 160 and the internal battery 170 are connected via the connector 180.

When the connector 180 and the internal battery 170 are connected, the controller 140 turns off the switch unit 185 at predetermined time intervals (e.g. 20 miliseconds) for a preset period (e.g. one second) so as to disconnect the connector 180 and the internal battery 170 from each other (step S150).

While the connector 180 and the internal battery 170 are disconnected, the controller 140 checks an output voltage of the connector 180, i.e. a voltage of a node through which power of the external battery 160 is output (step S160).

The controller 140 determines if an output voltage of the connector 180 is observed (step S 170).

The controller 140 determines that the external battery 160 has been detached from the connector 180 when an output voltage is not observed (step S180).

When it is determined that the external battery 160 has been detached from the connector 180, the controller 140 keeps the switch unit 185 turned off so the connector 180 and the internal battery 170 remain disconnected (step S 190).

Meanwhile, if an output voltage is observed in step S170, the controller 140 returns to step S140.

As described above, exemplary embodiments of the present invention can determine if the external battery is detached from the portable terminal in a convenient manner using the connector, which includes two nodes. Therefore, there may be more space to mount components within the portable terminal.

Furthermore, since the connector node, which is connected to the external battery, is disposed in a space generally occupied by an antenna, it may be possible to increase the volume of the antenna.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for sensing an external battery in a portable terminal comprising a connector with which the external battery is detachably assembled, method comprising:
   determining that the external battery is attached to the connector in response to detection of an output voltage;
   connecting the connector and an internal battery of the portable terminal to supply power from the external battery to the internal battery;
   disconnecting the connector from the internal battery to check an output voltage of the connector; and
   determining that the external battery has been detached from the connector in response to a determination that an output voltage is not detected.

2. The method of claim 1, wherein determining that the external battery is attached to the connector comprises determining that the output voltage of the connector is higher than a reference voltage.

3. The method of claim 1, wherein the connector remains disconnected from the internal battery in response to a determination that the external battery is detached from the connector.

4. An apparatus for sensing detachment of a detachable external battery in a mobile terminal, comprising:
   a connector to output power from the external battery when the external battery is assembled with the connector, the external battery being detachable from the connector;

a switch unit to connect the connector and an internal battery of the portable terminal to supply power from the external battery to the internal battery or disconnect the connector and the internal battery from each other to cut off the power from the external battery;

a controller determining that the external battery has been assembled with the connector when an output voltage of the connector is observed, so as to connect the connector and the internal battery with each other, the controller disconnecting the connector and the internal battery from each other during a predetermined time interval at a preset period, when an output voltage of the connector is not observed while the connector is disconnected from the internal battery, determining that the external battery has been detached from the connector.

5. The apparatus of claim 4, wherein the connector includes only two charging nodes.

6. The apparatus of claim 4, wherein the controller determines that the external battery has been assembled with the connector when the output voltage of the connector is higher than a predetermined reference voltage.

7. The apparatus of claim 4, wherein the controller turns off the switch unit so that the connector and the internal battery remain disconnected when an output voltage of the connector is not observed.

8. A method for sensing an external battery in a portable terminal comprising a connector with which the external battery is detachably assembled, the method comprising:

determining, at the portable terminal, that the external battery is attached to the connector in response to detection of an output voltage;

connecting, at the portable terminal, the connector and an internal battery of the portable terminal to supply power from the external battery to the internal battery;

disconnecting, at the portable terminal, the connector from the internal battery to check an output voltage of the connector; and determining, at the portable terminal, that the external battery has been detached from the connector in response to a determination that an output voltage is not detected.

9. The method of claim 8, wherein determining that the external battery is attached to the connector comprises determining that the output voltage of the connector is higher than a reference voltage.

10. The method of claim 8, wherein the connector remains disconnected from the internal battery in response to a determination that the external battery has been detached from the connector.

11. An apparatus for sensing detachment of a detachable external battery in a mobile terminal, the apparatus comprising:

a connector to output power from the external battery when the external battery is assembled with the connector, the external battery being detachable from the connector;

a switch unit to connect the connector and an internal battery of the portable terminal to supply power from the external battery to the internal battery, or to disconnect the connector and the internal battery from each other to cut off the power from the external battery;

a controller to determine that the external battery is attached to the connector and to connect the connector and the internal battery with each other in response to detection of an output voltage of the connector, to disconnect the connector and the internal battery from each other during a predetermined time interval at a preset period, and to determine that the external battery is detached from the connector in response to a determination that an output voltage is not detected.

12. The apparatus of claim 11, wherein the connector comprises no more than two charging nodes.

13. The apparatus of claim 11, wherein the controller is configured to determine that the external battery is attached to the connector in response to a determination that the output voltage of the connector is higher than a reference voltage.

14. The apparatus of claim 11, wherein the controller is configured to turn off the switch unit so that the connector and the internal battery remain disconnected in response to a determination that an output voltage of the connector is not observed.

* * * * *